United States Patent Office 3,173,881
Patented Mar. 16, 1965

3,173,881
PROCESS FOR THE RECOVERY OF ACTIVE CATALYTIC MATERIAL FROM AN ALUMINUM HALIDE-HYDROCARBON SLUDGE
Richard J. Schoofs, Lafayette, Calif., assignor to Shell Oil Company, New York, N.Y., a corporation of Delaware
No Drawing. Filed Oct. 31, 1962, Ser. No. 234,540
5 Claims. (Cl. 252—411)

This invention relates to a new and improved method of heat addition and reactor temperature control for use in a process for the recovery of active catalytic material from an aluminum halide-hydrocarbon sludge.

The use of Friedel-Crafts type catalysts such as aluminum halides for the conversion of hydrocarbons either alone or in the presence of such added promoters as hydrogen halide, organic halide, etc., is well known. Moreover, it is often desirable to modify the catalytic activity of the aluminum halide by interacting the catalyst with a hydrocarbon to form a light complex. In practically all of these processes, the aluminum catalyst is gradually converted to heavy aluminum halide-hydrocarbon sludge. The catalyst apparently forms complex compounds with the hydrocarbons undergoing treatment and in doing so, its catalytic activity is diminished or eliminated. The sludge is an exceedingly complex mixture of highly olefinic, conjugated and cyclic hydrocarbon (the hydrocarbon is sometimes described as a conjunct polymer) formed by a combination of reactions such as polymerization, hydrogen transfer and cyclization. Throughout this specification and claims the terms "aluminum halide-hydrocarbon sludge," "aluminum halide sludge" and "sludge" are all intended to designate the reaction product of an aluminum halide catalyst with a hydrocarbon or hydrocarbon mixture in which the activity of the catalyst is substantially diminished or eliminated.

Many methods have been suggested for the recovery of active catalyst material from aluminum halide sludge. Suggested methods included distillation, coking, destructive hydrogenation, decomposition of the aluminum halide to aluminum oxide and hydrogen halide, etc. One of the more attractive processes is the reaction of sludge with hydrogen.

In the past, the sludge has been reacted with hydrogen in a reactor wherein the heat necessary to raise the reactants to reaction temperatures and maintain these temperatures has been supplied by an external source, such as a jacket surrounding the reaction zone. This means of heat addition has several operational disadvantages. For example, when heat is added by means of a reactor jacket, the heat flux and high reactor skin temperatures associated with this method of heat addition increase the reactor corrosion rate. This increased corrosion rate naturally results in increased frequency of the unit shutdowns to inspect the reactor and concomitant higher maintenance costs.

In accordance with the present invention, crackable hydrocarbons are introduced into the reaction zone in controlled quantities such that the resulting heat liberated in hydrocracking these added hydrocarbons maintains the reaction zone at reaction temperatures. The external means of supplying heat to the reaction zone such as reactor jacket means can be eliminated and the concomitant corrosion rates will be reduced.

The method of heat addition and reactor temperature control is broadly applicable to the recovery of active catalytic material from an aluminum halide-hydrocarbon sludge wherein the reactants are introduced into the reaction zone at lower than reaction temperatures and insufficient heat is produced from cracking the sludge to provide the desired reaction temperature. For example, the method is applicable to a process suitable for restoring activity to the catalyst in the form of a mobile light aluminum halide-hydrocarbon complex. Moreover, the method likewise is applicable to the recovery of aluminum halide as such, substantially or entirely free of hydrocarbon material. In one particularly attractive embodiment of the invention, the aluminum halide catalyst is efficiently recovered from the sludge when treated with hydrogen in the presence of an antimony trihalide such as antimony trichloride or antimony tribromide and recovered as a liquid in admixture with the antimony trihalide.

The overall catalyst regeneration reaction can be considered in two parts: endothermic freeing of aluminum halide from the complex and exothermic hydrocracking of the conjunct polymer. When treating sludge of low complex aluminum halide content, it is particularly necessary to add additional heat input to the reaction in order to bring the reactants up to and maintain the reaction temperature. Moreover, when treating sludge of low complex aluminum halide content in the presence of antimony trihalide and these two materials are introduced into the reaction zone at lower than reaction temperature, the sensible heat required by the antimony trihalide is by far the largest item in the overall heat balance. This increase in heat requirement results from the fact that when operating at high antimony trihalide content, the sensible heat gain in the antimony trihalide is large relative to the heat of reaction. Therefore, the addition of crackable hydrocarbons to the reactor in controlled quantities is particularly attractive when treating the sludge in the presence of antimony trihalide.

The temperature at which the sludge is introduced into the reaction zone is governed to a large extent by two process conditions. The first process condition is the temperature at which the sludge is rejected or withdrawn from the conversion process. For example, in the liquid phase isomerization of paraffins with an aluminum chloride-antimony trichloride molten salt catalyst, the sludge is withdrawn from the reactor at from about 70° C. to about 100° C. In certain cases the sludge is further scrubbed with hydrocarbon to remove entrained hydrocarbon and active catalyst materials. The sludge is rejected from the scrubbing step at from about 65° C. to about 100° C. The second process condition is the solidification temperature of the sludge, e.g., the solidification temperature of the sludge from the aforementioned isomerization process is about 60° C. In order to facilitate handling the sludge, the sludge should be introduced into the reaction zone at a temperature at which it is in the liquid phase.

The "crackable" hydrocarbons which can be used in the invention are hydrocarbons such as raffinate, naphtha, kerosene, gas, oil, etc., which crack to hydrocarbons of lower molecular weights in the presence of an aluminum halide catalyst. These hydrocarbons are selected so that the cracked effluent can be recovered as either a liquid which is withdrawn from the reactor as a side stream or as a vapor which is withdrawn from the reactor together with the effluent gases resulting from the treating of the sludge with hydrogen. Because the liquid stream would contain some dissolved catalyst, it is preferred to select the crackable hydrocarbons so that the effluent can be recovered as a vapor at reaction conditions. The hydrocarbon can have boiling points within the range from about 65° C. to about 550° C., preferably from about 65° C. to about 400° C. Examples of suitable crackable hydrocarbons are low value saturate fractions in the gasoline or distillate boiling range or raffinates from the extraction of platformate or from the extraction of lubricating oils or heavy gas oils with furfural or phenols.

These crackable hydrocarbons can be introduced into the reactor in various ways such as by the addition to the reject catalyst stream before entering the reactor, by the addition to the hydrogen stream or by direct metering into the reaction zone. It is desirable to introduce the hydrocarbons at approximately reaction temperature in order to minimize the amount of hydrocarbon and concomitant hydrogen consumption necessary to maintain reaction conditions, and although it is not essential to the process, the hydrocarbon should be introduced into the reaction zone at least at its incipient cracking temperature. For example, a normal heptane stream will crack at essentially ambient temperature. The amount of hydrocarbon necessary to maintain the reaction conditions can be controlled by means which are known to those skilled in the art. For example, the reactor temperature is measured by a temperature sensing device such as a thermocouple located in a thermowell in the reaction zone. A temperature controller takes the signal from the temperature sensing device and transforms it into a control signal which is transmitted to a control valve which permits sufficient crackable hydrocarbon to be introduced into the reaction zone to provide the necessary heat addition to the reactor and maintain the reactor in heat balance. Such temperature measuring and control devices are well known and readily available.

The amount of heat input necessary to control the reactor temperature depends upon numerous factors such as the aluminum halide content of the sludge, the amount of antimony trihalide present, the type of complex, the desired reaction temperature, the degree of reaction, and the temperature at which the reactants are introduced into the reactants are introduced into the reaction zone. However, since in a preferred embodiment of the invention the amount of crackable hydrocarbons to be added to the reaction zone is automatically controlled, this control system will compensate for fluctuations in the various factors.

The reaction conditions for converting the sludge to liquid active catalytic material are a temperature range from about 100° C. to about 250° C. and a hydrogen partial pressure from about 200 p.s.i. to about 2500 p.s.i. The preferred reaction conditions are a temperature range from about 150° C. to about 225° C. and a hydrogen partial pressure from about 400 p.s.i. to about 1400 p.s.i.

Reaction contact time varies from about 5 minutes to about 10 hours depending upon the type of reactor design, contact efficiency, temperature, etc., and desired degree of reaction. The preferred contacting periods are from about 5 minutes to about 3 hours. The reactor is of appropriate design to insure intimate contact between the sludge and the reaction gases. The reaction zone can be agitated by suitable means such as a mixer or the reactor can be a packed or unpacked column employing countercurrent or concurrent contacting techniques. It is preferred to employ a countercurrent contactor to make more effective use of the hydrogen partial pressure. For example, in one embodiment of the invention, an aluminum halide-hydrocarbon sludge from a conversion process and antimony trihalide enter the reactor at the upper end thereof and pass countercurrently to the hydrogen and hydrogen halide reaction gas through the reaction zone. The active aluminum halide is recovered as a liquid in admixture with the antimony trihalide from the bottom of the reactor. The effluent gases containing hydrogen, hydrogen halide and hydrocarbon are withdrawn from the top of the reactor.

The hydrogen should be essentially dry and is desirably free from hydrogen sulfide. The hydrogen consumption varies from about 5 to about 36 standard cubic feet per pound of hydrocarbon in the sludge. It is desirable to use excess hydrogen, i.e., a hydrogen feed rate to the reactor of greater than the hydrogen consumption, for example, up to 10 times the hydrogen consumption in order to maintain high hydrogen partial pressure over the reactor length. Preferably the hydrogen feed rate to the reactor is about 2 to about 6 times the hydrogen consumption.

It is generally desirable to treat the sludge in the presence of a hydrogen halide such as hydrogen chloride or hydrogen bromide. When the treating is done in the presence of antimony trihalide, e.g., antimony trichloride, the hydrogen halide suppresses the decomposition of the antimony trichloride. The amount of hydrogen halide present is suitably from about 2 to about 20% by volume basis total hydrogen plus hydrogen halide. The preferred amount of hydrogen halide is from about 4% by volume to about 12% by volume basis total hydrogen plus hydrogen halide.

I claim as my invention:

1. In a process for the recovery of active aluminum halide from an aluminum halide-hydrocarbon sludge wherein sludge is introduced at a temperature lower than reaction temperature into a catalyst regeneration zone in which the sludge is reacted with hydrogen at a temperature from about 100° C. to about 250° C. and a hydrogen partial pressure from about 200 to 2500 p.s.i. to produce free aluminum halide and low-boiling hydrocarbons, the improvement which comprises introducing into the catalyst regeneration zone and cracking therein controlled quantities of crackable hydrocarbon such that the resulting exothermic heat of hydrocracking the hydrocarbon maintains the reaction zone at reaction temperature.

2. In a process for the recovery of active aluminum halide from an aluminum halide-hydrocarbon sludge in the presence of antimony trihalide wherein sludge is introduced at a temperature lower than reaction temperature into a catalyst regeneration zone in which the sludge is reacted with hydrogen at a temperature from about 100° C. to about 250° C. and a hydrogen partial pressure from about 200 to 2500 p.s.i. to produce free aluminum halide and low-boiling hydrocarbons, the sensible heat required to raise the temperature of the antimony trihalide to reaction temperature being the principal heat requirement in the reaction zone, the improvement which comprises introducing into the catalyst regeneration zone and cracking therein controlled quantities of crackable hydrocarbon such that the resulting exothermic heat of hydrocracking the hydrocarbon maintains the reaction zone at reaction temperature.

3. A process according to claim 2, wherein the crackable hydrocarbon comprises a naphtha.

4. A process according to claim 2, wherein the crackable hydrocarbon comprises a distillate.

5. A process according to claim 2, wherein the crackable hydrocarbon comprises a raffinate.

References Cited by the Examiner
UNITED STATES PATENTS 2,180,220  11/39  Boyd _____ 252—415
2,999,071  9/61   Frey _____ 252—411

MAURICE A. BRINDISI, *Primary Examiner.*